US005720168A

United States Patent [19]

Harnischfeger

[11] Patent Number: 5,720,168

[45] Date of Patent: Feb. 24, 1998

[54] CONTROL DEVICE FOR A HYDRAULIC PUMP

[75] Inventor: Edwin Harnischfeger, Bad Orb, Germany

[73] Assignee: Mannesmann Rexroth GmbH, Lohr/Main, Germany

[21] Appl. No.: 693,148

[22] PCT Filed: Feb. 21, 1995

[86] PCT No.: PCT/EP95/00611

§ 371 Date: Aug. 9, 1996

§ 102(e) Date: Aug. 9, 1996

[87] PCT Pub. No.: WO95/23292

PCT Pub. Date: Aug. 31, 1995

[30] Foreign Application Priority Data

Feb. 26, 1994 [DE] Germany .......................... 44 06 318.0

[51] Int. Cl.[6] ...................................................... F16D 31/02

[52] U.S. Cl. ................................................ 60/452; 60/445

[58] Field of Search ......................................... 60/445, 452

[56] References Cited

U.S. PATENT DOCUMENTS

| | | | |
|---|---|---|---|
| 5,493,861 | 2/1996 | Friedrichsen | 60/452 |
| 5,528,911 | 6/1996 | Roth et al. | 60/445 |

FOREIGN PATENT DOCUMENTS

| | | | |
|---|---|---|---|
| 513360 | 11/1992 | European Pat. Off. | 60/445 |
| 0564939 | 10/1993 | European Pat. Off. | |
| 3901207 | 7/1990 | Germany | |
| 4210252 | 9/1993 | Germany | |
| 4308004 | 10/1993 | Germany | |
| 59003 | 5/1981 | Japan | 60/452 |
| 40102 | 3/1982 | Japan | 60/452 |
| 1275902 | 11/1989 | Japan | 60/445 |
| 285302 | 10/1992 | Japan | 60/445 |

OTHER PUBLICATIONS

Oilhydraulic and Pneumatik, vol. 38, No. 5, Jan. 1, 1994 pp. 250–252, 255, XP 000195276 "Grundlagen der hydraulischen Schaltungstechnik".

Oilhydraulic and Pneumatik, vol. 38, No. 8, Jan. 1, 1994, pp. 473–478, 480, XP 000195316, Esders H "Elektrohydraulisches Load–Sensing Fur Die Mobilhydraulik".

*Primary Examiner*—F. Daniel Lopez

*Attorney, Agent, or Firm*—Martin A. Farber

[57] ABSTRACT

A control system for a variable-displacement hydraulic pump having an adjustment device and being electrical current-adjustable as required for supplying pressure to a first hydraulic apparatus (13), and pressure-adjustable for supplying pressure to a second hydraulic apparatus (14), in which case the pressure rating and the setting of the pilot valve controlled by the second hydraulic apparatus (14) may be programmed by a control signal. The control system includes a first control valve (18) that can be actuated by the weight of the load of the first apparatus (13) and by a spring (23) when switching to a higher displacement, or by the pump pressure when switching to a lower displacement. The system further includes a second control valve (19) which can be exposed to a force corresponding to the control signal (25) when switching to a higher displacement, or to the pump pressure when switching to a lower displacement.

5 Claims, 1 Drawing Sheet

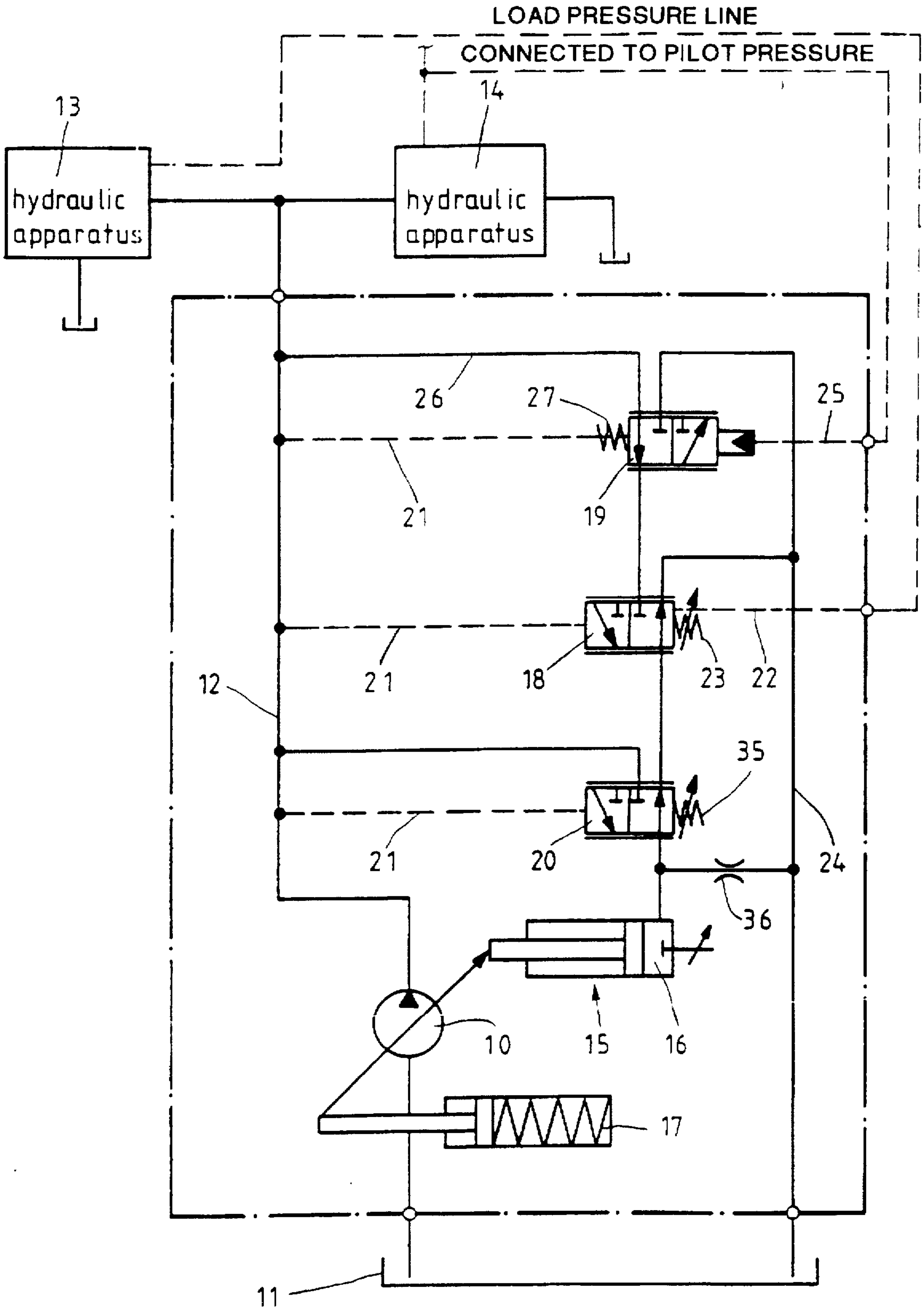
LOAD PRESSURE LINE
CONNECTED TO PILOT PRESSURE
13
hydraulic apparatus
14
hydraulic apparatus
26
27
25
21
19
21
18
23
22
12
35
21
20
24
36
10
15
16
17
11

CONTROL DEVICE FOR A HYDRAULIC PUMP

FIELD AND BACKGROUND OF THE INVENTION

The present invention relates to a control device for a hydraulic pump. In accordance with claim 1, by means of this control device, the hydraulic pump, which has a hydraulic displacement device is to be displaceable, by control of the flow as required for the supplying of hydraulic fluid to a first hydraulic apparatus and by pressure control for the supplying of hydraulic fluid to a second hydraulic apparatus, in which connection the pressure set and the setting of a servo-valve associated with the second hydraulic apparatus can, in the second case, be controlled jointly by a command signal.

The control of the flow of a variable-displacement hydraulic pump as required is also known as load-sensing control. This type of control is characterized by the fact that the pump pressure rises by a given $\Delta p$ above the highest load pressure of all hydraulic apparatus which are controlled in this manner in parallel to each other. The pump pressure drops to the load pressure over an adjustable aperture which is associated with the apparatus having in each case the highest load pressure. Depending on the cross section of the aperture, the amount of fluid delivered by the pump must be greater or smaller in order to maintain the predetermined pressure difference. For this load-sensing control of the hydraulic pump a control device associated with it has a control valve which can be acted on in the direction of larger displacement volume by the highest load pressure and by a spring, and in the direction of small displacement volume by the pump pressure.

From Federal Republic of Germany 43 08 004 A1, a control for a variable-displacement hydraulic pump is known which is a pressure control. In that case, the pressure to be controlled and the adjustment of a servo-valve which is associated with a hydraulic apparatus which is supplied with hydraulic fluid by a hydraulic pump controlled in this manner can be programmed jointly by a command signal. The command signal can, for instance, be a pilot pressure which is set by means of a pre-control device and acts in the direction of larger displacement volume on the slide of the servo-valve and on the control piston of a control valve associated with the variable-displacement pump. In the direction of smaller displacement volume, the pump pressure can act on the control piston of the control valve, in which case, by a difference in size of the areas acted on by the pressures, a control position of the control piston is possible. Furthermore, the pilot pressure can be increased to the level of the pump pressure by means of a copying valve, so that equally large actuation areas on the control piston are possible. In the case of a control in accordance with Federal Republic of Germany 43 08 004 A1, a given pump pressure is established and the slide of a servo-valve is brought into a given position in which the servo-valve can also already be open. If the pre-established pump pressure is less than the pressure necessary in order to move the apparatus, the apparatus remains at rest despite the fact that the servo-valve is open. Only when the pump pressure reaches the apparatus pressure by an increase in the command signal does the apparatus start to move. This movement therefore commences at a cross section of the opening of the servo-valve which is greater the higher the load is.

From Federal Republic of Germany 43 08 004 A1, it is also known to adjust a variable displacement hydraulic pump which supplies several hydraulic apparatus with hydraulic fluid by load-sensing control for first apparatus and by pressure control for second apparatus. Whether a reported maximum load pressure of the first apparatus or the predetermined command signal requires a higher pump pressure depends on what type of control is used. For this purpose, the highest load pressure or a pressure generated from the command signal by means of a nozzle and a displaceable pressure-limiting valve is connected via a shuttle valve to a control space of a control valve of the variable displacement pump.

SUMMARY OF THE INVENTION

The object of the present invention is to create a control device which can dispense with a shuttle valve for a hydraulic pump which can be displaced by load-sensing control and by pressure control.

This object is achieved in the manner that the control device comprises a first control valve for the load-sensing control and a second control valve for the pressure control, and that the displacement device can be controlled in each case by the control valve the control position of which requires the higher pump pressure in accordance with the height of the command signal and of the load pressure.

BRIEF DESCRIPTION OF THE DRAWING

With the above and other advantages in view, the present invention will become more clearly understood in connection with the detailed description of a preferred embodiment, when considered with the accompanying drawing, of which the sole figure shows a control device for a hydraulic pump according to the invention.

DETAILED DESCRIPTION OF THE PREFERRED EMBODIMENT

In accordance with the drawing, a variable-displacement hydraulic pump 10 can draw hydraulic fluid out of a tank 11 and deliver it into a pressure line 12. Via this line, first hydraulic apparatus 13 are controlled by load sensing and second hydraulic apparatus 14 by pressure. The variable-displaceable pump 10 has a displacement device 15 in the form of a hydraulic cylinder the piston of which can be displaced in the direction of a reduction of the displacement volume of the pump by the action of the pressure of a piston-side pressure space 16 against the force of a spring 17. Upon a relief of pressure in the pressure space, the spring 17 can push the piston back in the direction of an increase in the displacement volume.

The displacement device 15 is controlled by several control valves 18, 19 and 20, all of which are developed as 3/2 continuous-directional control valves and each of which has an axially movable control piston. All control pistons can be acted on in the one axial direction via in each case a control line 21 by the pump pressure prevailing in the pressure line 12.

The control piston of the first control valve 18 can be acted on in the opposite direction via a command line by the highest load pressure present on the first apparatus 13 which has just been actuated. A compression spring 23 acts in the same direction, its initial tension being such that an equilibrium of forces is present on the control piston of the valve 18 when the pump pressure is 10 to 20 bars higher than the highest load pressure. When the pump pressure predominates, an outlet of the control valve 18 is connected to an inlet which is connected to the outlet of the second control valve 19. When the load pressure together with the force of the spring 23 predominates, the outlet is connected directly to a tank line 24, bypassing the control valve 19.

The control piston of the control valve 19 can be acted on, in opposition to the pump pressure, via a command line 25 by a pilot pressure which can be programmed, for example, by a pre-control device which operates on the basis of pressure reduction valves. While in the case of the regulating valve 18, the areas on the control piston which are acted on by the pump pressure and the load pressure are equal, the pressure surfaces on the control piston of the control valve 19 differ, since the pilot pressure is generally substantially less than the pump pressure. The areas on which the pilot pressure acts can, for instance, be ten times as great as the other area, so that, with a pilot pressure which is ten times less than the pump pressure, an equilibrium of forces can be produced on the control piston of the control valve 19. The outlet of the control valve 19 which is connected with an inlet of the regulating valve 18 is, when the pump pressure predominates, connected to an inlet which is connected via a line 26 to the pressure line 12. When the pilot pressure predominates, said outlet is connected with the tank line 24. The control piston of the control valve 19 is still acted on by a slightly prestressed compression spring 27 which sees to it that the control piston assumes a specific position of rest when the pump 10 is disconnected. This spring is not necessary for the control.

A maximum system pressure can be adjusted by the third control valve 20. The control piston of this valve is acted on against the pump pressure by an adjustable compression spring 35 which, below the maximum system pressure, maintains the valve in a position in which the pressure space 16 is connected to the outlet of the control valve 18. When the maximum system pressure is reached, the valve 20 connects the pressure space 16 to the pressure line 12.

When the pump is disconnected, the pressure space 16 is relieved towards the tank line 24 via the valves 20 and 18, and also via a nozzle 36 lying in the connection between the pressure space 16 and the tank line 24. The pump 10 is therefore set to maximum displacement volume. If it is now connected, a pressure builds up in the pressure line 12 even in the absence of signals in the lines 22 and 25, and this pressure displaces the control piston of the valve 18 so that the pressure space 16 is connected via the three control valves to the pressure line 12, and the pump 10 swings back. Such a pump pressure is established that an equilibrium of forces between the force produced by the pump pressure and the force of the spring 23 prevails on the control piston of the valve 18. The amount of the pressure is therefore 10 to 20 bar depending on the initial stress of the spring 23.

With a load signal in the command line 22, the pressure space 16 is first of all relieved so that the pump 10 swings out and the pressure in the pressure line 12 increases until an equilibrium of forces is again present on the control piston of the control valve 18, which equilibrium is now, however, at a higher level.

If a pressure signal is now given on the command line 25, nothing changes in the condition of the control valves and the displacement device as long as a pump pressure which is below the pump pressure already reached on the basis of the signal in the command line 12 corresponds to this pilot pressure. If the pilot pressure in the command line 25 increases above a value which corresponds to the instantaneous pump pressure, then the outlet of the control valve 19 which is connected to the control valve 18 is connected to the tank line 24. The pressure space 16 is relieved of pressure so that the pump 10 swings out and the pressure in the pressure line 12 rises above the pressure corresponding to the pressure in the command line 22 up to such a value that an equilibrium of forces between the force produced by the pump pressure and the force produced by the pilot pressure in the command line 25 is produced on the control piston in the control position of the control piston of the control valve 19. The higher pump pressure displaces the control piston of the control valve 18 in such a manner that its outlet is connected to the outlet of the control valve 19 so that now the control valve 19 alone controls.

The displacement device 15 therefore, insofar as the pressure in the command line 25 requires a higher pump pressure than the pressure in the command line 22, is controlled solely by the control valve 19 and, insofar as the pressure in the command line 22 requires a higher pump pressure than the pressure in the command line 25, alone by the control valve 18.

We claim:

1. A control device for a hydraulic pump which has a hydraulic displacement device and is controlled by load-sensing for supplying of hydraulic fluid to a first hydraulic apparatus and controlled by pressure for supplying of hydraulic fluid to a second hydraulic apparatus, the pressure adjusted and a setting of a servo-valve associated with the second hydraulic apparatus being programmable jointly by a command signal, comprising:

a spring, and a first control valve which is acted on in a direction of a larger displacement volume of the hydraulic pump by load pressure of the first apparatus and by said spring, and, in direction of a smaller displacement volume, by a pump pressure; and a second control valve which is acted on in the direction of larger displacement volume by a force corresponding to the command signal and in the direction of a smaller displacement volume by the pump pressure, the displacement device being controllable in each case by the control valve which requires higher pump pressure.

2. A control device according to claim 1, wherein said second control valve is connectable via the first control valve with the displacement device and the first control valve is connectable via the second control valve to pressure side of the hydraulic pump.

3. A control device according to claim 2, wherein a connection of the first control valve is connected to a tank independently of the second control valve and a connection of the second control valve is connected to the tank independently of the first control valve.

4. A control device according to claim 3, wherein:

both said control valves are 3/2 continuous-directional control valves;

a connection of the first control valve which is connected with the displacement device is connectable alternately with said connection connected to the tank or with a connection of the first control valve connected with a connection of the second control valve; and the connection of the second control valve which is connected with the one connection of the first control valve is connectable alternately with said connection connected to the tank or with a connection of the second control valve which is connected to the pressure side of the hydraulic pump.

5. A control device according to claim 1, wherein a connection of the first control valve is connected to a tank independently of the second control valve and a connection of the second control valve is connected to the tank independently of the first control valve.

* * * * *